(12) United States Patent
Fletcher et al.

(10) Patent No.: US 9,845,773 B2
(45) Date of Patent: Dec. 19, 2017

(54) ASPIRATOR AND EJECTOR SYSTEM

(71) Applicants: David E. Fletcher, Flint, MI (US); Brian M. Graichen, Leonard, MI (US); Matt Gilmer, Whitmore Lake, MI (US); Andrew Niedert, New Hudson, MI (US); Steve Long, Berkley, MI (US)

(72) Inventors: David E. Fletcher, Flint, MI (US); Brian M. Graichen, Leonard, MI (US); Matt Gilmer, Whitmore Lake, MI (US); Andrew Niedert, New Hudson, MI (US); Steve Long, Berkley, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 391 days.

(21) Appl. No.: 14/334,094

(22) Filed: Jul. 17, 2014

(65) Prior Publication Data
US 2015/0020524 A1    Jan. 22, 2015

Related U.S. Application Data

(60) Provisional application No. 61/847,428, filed on Jul. 17, 2013.

(51) Int. Cl.
*F02B 33/44* (2006.01)
*F02M 35/10* (2006.01)

(52) U.S. Cl.
CPC ..... *F02M 35/10229* (2013.01); *F02M 35/10157* (2013.01); *Y02T 10/144* (2013.01)

(58) Field of Classification Search
CPC ........ F02M 35/10229; F02M 35/10157; Y02T 10/144

(Continued)

(56) References Cited

U.S. PATENT DOCUMENTS 3,426,738 A * 2/1969 Goodwine, Jr. ......... C10M 1/08
123/1 A
3,924,588 A * 12/1975 Hager .................... F02M 25/06
123/574

(Continued)

FOREIGN PATENT DOCUMENTS

| CN | 102678342 | 9/2012 |
|---|---|---|
| DE | 102012015290 | 2/2014 |
| JP | 2003-201927 | 7/2003 |

OTHER PUBLICATIONS

PCT, International Search Report and Written Opinion, International Application No. PCT/US2014/047005 (dated Nov. 28, 2014).

(Continued)

*Primary Examiner* — Hoang Nguyen
*Assistant Examiner* — Thomas Olszewski
(74) *Attorney, Agent, or Firm* — FisherBroyles, LLP; Susan M. Oiler

(57) ABSTRACT

An engine system having a flowpath between a junction upstream of a turbocharger and an intake manifold that includes an ejector and an aspirator connected in parallel relative to one another within the flowpath is disclosed. The motive flow through the ejector is in the opposite direction relative to the direction of the motive flow through the aspirator, and both the ejector and the aspirator have a suction port fluidly coupled to a device requiring vacuum. The engine system also includes a first check valve disposed in control of the motive flow through the ejector and a second check valve disposed in control of the motive flow through the aspirator and may also include a control valve in fluid communication within the flowpath upstream or downstream of the ejector and the aspirator that controls the flow into and/or out of both thereof.

20 Claims, 1 Drawing Sheet

(58) Field of Classification Search
USPC .......................................................... 60/605.1
See application file for complete search history.

(56) References Cited

U.S. PATENT DOCUMENTS

| | | | |
|---|---|---|---|
| 4,318,273 A | | 3/1982 | Nohira et al. |
| 5,890,475 A | * | 4/1999 | Dallman ................ F02M 25/06 |
| | | | 123/573 |
| 7,290,536 B2 | | 11/2007 | Lindmark et al. |
| 9,010,115 B2 | | 4/2015 | Pursifull et al. |
| 9,108,607 B2 | * | 8/2015 | Ulrey ............... F02M 35/10229 |
| 2009/0132149 A1 | | 5/2009 | Hirooka |
| 2011/0132311 A1 | * | 6/2011 | Pursifull .......... F02M 35/10229 |
| | | | 123/184.56 |
| 2012/0237365 A1 | | 9/2012 | Ulrey et al. |
| 2013/0233276 A1 | * | 9/2013 | Pursifull ................... F02D 9/02 |
| | | | 123/337 |
| 2013/0340732 A1 | * | 12/2013 | Pursifull .......... F02M 35/10222 |
| | | | 123/572 |

OTHER PUBLICATIONS

EP, Extended European Search Report and Opinion, European Patent Application No. 14826613.3, 7 pages (dated Dec. 21, 2016).
CN, Search Report with English translation, Chinese Patent Application No. 201480000828.5 (dated Apr. 25, 2016).
CN, Office Action, Chinese Patent Application No. 201480000828.5 (dated May 5, 2016).
CN, English Translation of Office Action, Chinese Patent Application No. 201480000828.5 (dated May 5, 2016).
CN, Second Office Action and Search Report with English translation, Chinese Patent Application No. 201480000828.5 (dated Nov. 28, 2016).

* cited by examiner

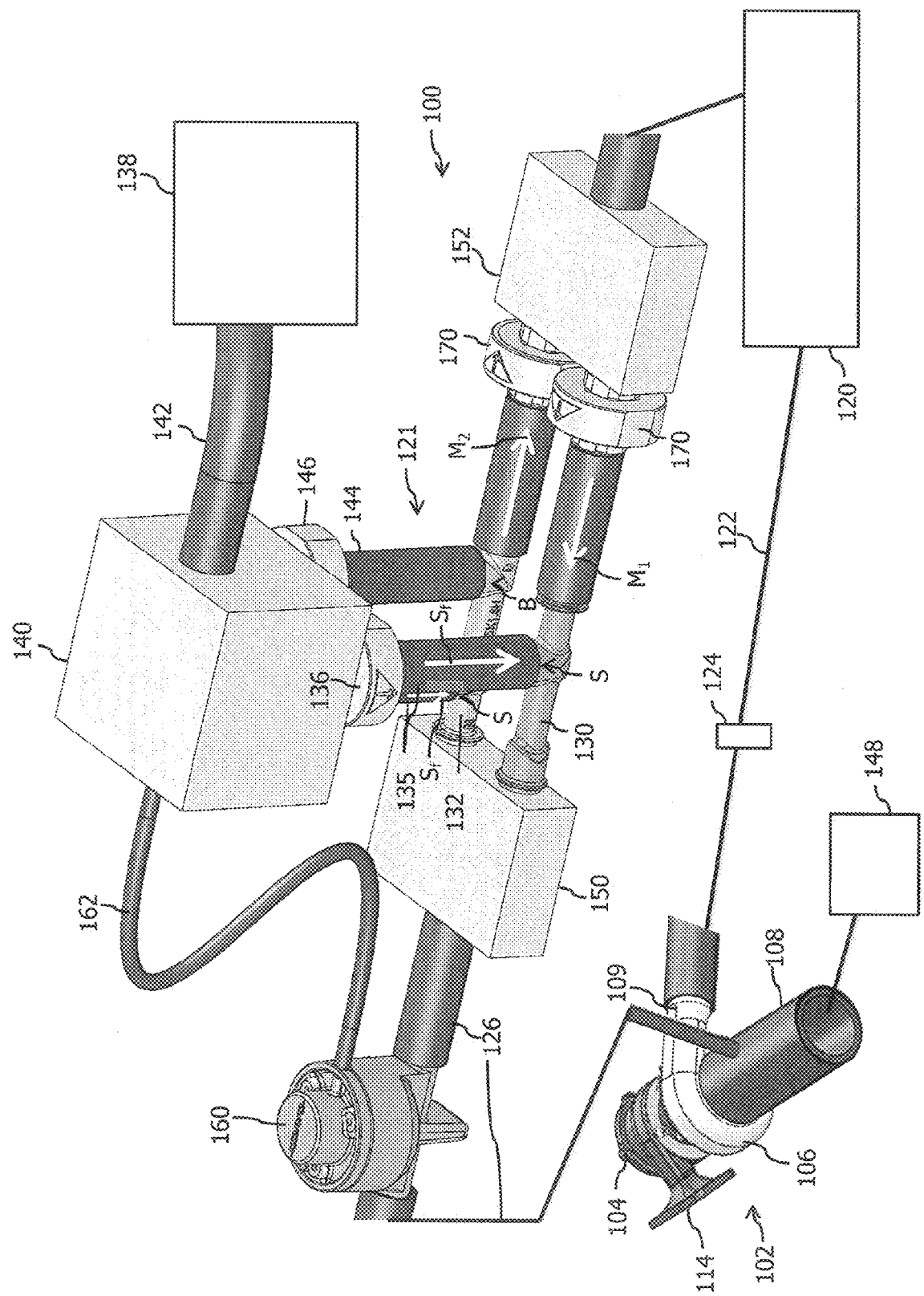

ASPIRATOR AND EJECTOR SYSTEM

RELATED APPLICATIONS

This application claims the benefit of U.S. Provisional Application 61/847,428, filed Jul. 17, 2013, which is herein incorporated by reference in its entirety.

TECHNICAL FIELD

This application relates to aspirator and ejector systems, more particularly to aspirator and ejector systems within internal combustion engines having an exhaust-driven turbocharger.

BACKGROUND

Internal combustion engines, its mechanisms, refinements and iterations are used in a variety of moving and non-moving vehicles or housings. Today, for example, internal combustion engines are found in terrestrial passenger and industrial vehicles, marine, stationary, and aerospace applications. There are generally two dominant ignition cycles commonly referred to as gas and diesel, or more formally as spark ignited and compression ignition, respectively. More recently, exhaust-driven turbochargers have been incorporated into the system connected to the internal combustion engine to improve the power output and overall efficiency of engine.

There is a need to continue to improve the efficiency, power, and control within engine systems, including the generation of vacuum for various applications such as brake boost.

SUMMARY

In one aspect, an engine system having a flowpath between a junction upstream of a turbocharger and an intake manifold that includes an ejector and an aspirator connected in parallel relative to one another within the flowpath is disclosed. The motive flow through the ejector is in the opposite direction relative to the direction of the motive flow through the aspirator, which is from the intake manifold toward the junction upstream of the turbocharger, and both the ejector and the aspirator have a suction port fluidly coupled to a device requiring vacuum. The engine system also includes a first check valve disposed in control of the motive flow through the ejector and a second check valve disposed in control of the motive flow through the aspirator and may also include a control valve in fluid communication within the flowpath upstream or downstream of the ejector and the aspirator that controls the flow into and/or out of both thereof.

The engine system may also include a third check valve disposed in control of the flow through the suction port of the ejector and a fourth check valve disposed in control of the flow through the suction port of the aspirator. In addition, the aspirator includes a bypass port having a bypass check valve disposed in control of flow therethrough.

During operation of the engine system, when under a boost condition with the throttle open, the motive flow through the ejector is in a direction moving from the intake manifold toward the junction upstream of the turbocharger, and when under an idle condition, the motive flow is through the aspirator in a direction moving from the junction upstream of the turbocharger toward the intake manifold.

The control valve may be a vacuum actuated control valve or an electromagnetically actuated control valve.

BRIEF DESCRIPTION OF THE DRAWINGS

FIG. 1 is a side, perspective view of portions of one embodiment of a system having an aspirator and an ejector in parallel combined with some schematically represented connections to components in an engine system.

DETAILED DESCRIPTION

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIG. 1 illustrates an embodiment of an engine system 100, typically an internal combustion engine system, that includes several common features such as a turbocharger 102 in fluid communication with an intake manifold 120 of an engine system. The turbocharger 102 includes a turbine section 104 having an inlet opening (not seen in the particular view) and an exhaust outlet 114 and a compressor section 106 having an ambient air inlet, not visible because it is connected to an ambient air conduit 108, and a discharge conduit 109. Housed within the turbine section 104 is a turbine wheel that harnesses and converts exhaust energy into mechanical work through a common shaft to turn a compressor wheel housed within the turbine section 106 that ingests air from an air induction system 148, compresses it and feeds it at higher operating pressures into an intake manifold 120 of an internal combustion engine (not shown).

The discharge conduit 109 of the compressor section 106 of the turbocharger 102 is in fluid communication with the intake manifold 120, and the air induction conduit 108, which is connected to the ambient air inlet of the compressor section 106, is also in fluid communication with the intake manifold 120, but through an aspirator and ejector assembly 121 in FIG. 1. Accordingly, a first flowpath 122 is defined between the discharge conduit 109 and the intake manifold 120. The first flowpath 122 may include a throttle 124 therein. A second flowpath 126, separate from the first flowpath 122, is defined between the ambient air conduit 108 through the aspirator and ejector assembly 121 to the intake manifold 120. The turbine section 104 of the turbocharger 102 is also in fluid communication with other parts of the system. For example, the exhaust inlet of the turbine section may be in fluid communication with an exhaust manifold of the internal combustion engine, and the exhaust outlet 114 may be in fluid communication with a catalytic converter.

The second flowpath 126 includes an ejector 130 and an aspirator 132 forming a portion thereof. While the system disclosed herein is described with respect to the second flowpath 126 connected as illustrated, the systems are not limited thereto. It is possible to include the ejector 130 and aspirator 132, as described herein, in any flowpath between other components of an engine system to generate and/or control vacuum generation and use. The ejector 130 and the aspirator 132 may be connected in series or in parallel.

A parallel configuration is shown in FIG. 1 and includes the ejector 130 and the aspirator 132 each having a suction port (S) fluidly coupled to a device requiring vacuum 138, which can be a vacuum canister reservoir. The vacuum generated may be used for actuating various engine vacuum actuators. These may include, for example, vehicle brake boosters, fuel vapor purge control systems, etc. In the embodiment of FIG. 1 the vacuum generated by the ejector 130 and aspirator 132 may be directly applied to the actuator portion of valve 160.

In the figures, the suction ports (S) are each covered by a connector 135 that fluidly couples the suction port (S) to its own check valve 136 (one of which is not visible in the perspective view of FIG. 1). In another embodiment, each check valve 136 may be integral with the associated housing that defines the suction portion it controls. As seen in FIG. 1, the ejector 130 and aspirator 132 may be fluidly coupled to the same device requiring vacuum 138 which may be accomplished by separate fluid connections thereto or, as shown, by a multi-port junction 140 connecting the plurality of suction ports (S) to a trunk line 142 in fluid communication with the vacuum canister 138.

The aspirator 132 includes a bypass port (B) also fluidly coupled to the same device requiring vacuum 138, which may be accomplished by separate fluid connections thereto or, as shown by connection to the multi-port junction 140. The bypass port (B) is covered by a connector 144 to fluidly couple it to its own check valve 146. In another embodiment, check valve 146 may be integral with the associated housing that defines the bypass port it controls. While the embodiment in FIG. 1 is illustrated with one ejector 130 and one aspirator 132, the system 100 is not limited thereto and may include an unlimited number of ejectors and aspirators, including three, four, five, or more connected in parallel to the same device requiring vacuum or to different devices requiring vacuum. As noted above a device requiring a vacuum as used herein includes a vacuum canister/reservoir.

Within the second flowpath 126, since the ejector 130 and aspirator 132 are in parallel, a first multi-port junction 150 and a second multi-port junction 152 are used to connect the ejector 130 and aspirator 132 to the trunk line of the second flowpath 126. The first multi-port junction 150 connects the ejector 130 and the aspirator 132 to the portion of the trunk line in fluid communication with the ambient air conduit 108, and the second multi-port junction 152 connects the ejector 130 and the aspirator 132 to the portion of the trunk line in fluid communication with the intake manifold 120. As illustrated in FIG. 1, one embodiment of an engine system may also include additional check valves 170 disposed in control of the motive flow through each of the ejector 130 and the aspirator 132. A first check valve 170a is disposed between the ejector 130 and the second multi-port junction 152 and a second check valve 170b is disposed between the aspirator 132 and the second multi-port junction 152, but are not limited to those positions.

The second flowpath 126 may also include a valve 160, which may be vacuum controlled by the vacuum generated by the ejector aspirator assembly 121. The valve 160 may be connected directly to the ejector aspirator assembly 121 by a hose 162, another similar fluid connecting device, or indirectly through the multi-port junction 150. In another embodiment, the valve 160 may be fluidly connected to a vacuum canister that is fluidly connected to the suction orts of the ejector and aspirator assembly. The valve 160 may be disposed more proximate the turbocharger 102 than the aspirators 130, 132, but is not limited thereto.

In operation, under certain engine operating conditions, the ejector 130 and aspirator 132 may be controlled to generate vacuum quickly and/or to generate a depth of vacuum. As illustrated by the arrows in FIG. 1, the ejector 130 is connected within the second flowpath such that the motive flow (the arrow labeled $M_1$) therethrough is in the opposite direction as the motive flow (the arrow labeled $M_2$) through the aspirator 132. In this embodiment, the check valves 170a, 170b provide the ability for the motive flow $M_1$ and $M_2$ to be in opposing directions. Here, when the engine is under boost condition, the motive flow ($M_1$), through the ejector 130, is in a direction moving from the intake manifold 120 toward the air induction conduit 108. However, when the engine is under idle conditions, the aspirator 132 controls the generation of the vacuum with its motive flow ($M_2$) being in a direction moving from the air induction conduit 108 toward the intake manifold 120. In FIG. 1, the arrows labeled $S_f$ indicate the direction of suction flow (creating the vacuum in a device requiring vacuum or a vacuum canister 138) when a motive flow is present through the ejector 130 or the aspirator 132.

The Venturi gap within each of the ejector 130 and the aspirator 130 may be of the same or similar internal construction or may be different depending upon the amount of suction desired under boost versus idle or under other engine conditions. In one embodiment, the internal junction of the motive portion (converging toward the Venturi gap) and the suction port of the ejector 130 may be different from the similarly located internal junction within the aspirator 132. Within both the ejector 130 and the aspirator 132, opposite the motive portion is a discharge portion (diverging away from the Venturi gap).

The valve 160 can be designed to be normally open or normally closed. It can be either pneumatically actuated or electromagnetically actuated. When the valve 160 is pneumatic and the vacuum in vacuum canister 138 falls below a predetermined value, the valve will open to permit motive flow to occur. If the engine is operating, then the ejector or aspirator will remove air from vacuum canister 138, reducing the air pressure inside and increasing the vacuum. When the vacuum exceeds a predetermined amount the valve will close and prevent motive flow.

In another embodiment, the valve 160 is electromagnetically actuated rather than vacuum actuated. When electromagnetically actuated, the engine computer will determine when to permit or suppress motive flow through flowpath 126 and hence through the ejector 130 or aspirator 132. Among the factors that the computer algorithm may consider when deciding to open or close the valve are engine parameters such as intake manifold pressure, engine temperature, engine speed, and engine power demand. Among the aftertreatment parameters to be considered include NOx treatment status, particulate filter status, etc. Finally, the status of the pressure in the vacuum canister and/or in vacuum consuming devices may be accounted for as well in determining when to open and/or close the valve 160.

Besides controlling how quickly vacuum and/or to depth of vacuum is generated, the system disclosed herein is advantageous in that it can generate vacuum regardless of the direction of the flow through the flowpath 126.

Having described the invention in detail and by reference to preferred embodiments thereof, it will be apparent that modifications and variations are possible without departing from the scope of the invention which is defined in the appended claims.

What is claimed is:
1. An engine system comprising:
   a flowpath between a junction upstream of a turbocharger and an intake manifold of an engine intake system;
   an ejector and an aspirator connected in parallel relative to one another and forming a portion of the flowpath;
   wherein a first motive flow through the ejector is in an opposite direction relative to a direction of a second motive flow through the aspirator, the second motive flow being in a direction from a junction upstream of the turbocharger toward the intake manifold; and a first check valve disposed in control of the first motive flow through the ejector and a second check valve disposed in control of the second motive flow through the aspirator;

wherein the first check valve allows fluid flow in the direction of the first motive flow under a boost condition with the throttle open;

wherein both the ejector and the aspirator have a suction port fluidly coupled to a device requiring vacuum.

2. The engine system of claim 1, wherein the aspirator and the ejector are both connected to the same device requiring vacuum.

3. The engine system of claim 1, wherein the motive flow through the ejector is from the intake manifold toward the junction upstream of the turbocharger.

4. The engine system of claim 1, wherein the second check valve allows fluid flow in the direction of the second motive flow under idle conditions.

5. The engine system of claim 4, further comprising a third check valve disposed in control of the flow through the suction port of the ejector and a fourth check valve disposed in control of the flow through the suction port of the aspirator.

6. The engine system of claim 1, wherein the aspirator includes a bypass port having a bypass check valve disposed in control of flow therethrough.

7. The engine system of claim 1, further comprising a control valve in fluid communication within the flowpath downstream of the ejector and the aspirator and controlling the flow into the ejector and out of the aspirator.

8. The engine system of claim 1, further comprising a control valve in fluid communication within the flowpath upstream of the ejector and the aspirator and controlling the flow into the aspirator and out of the ejector.

9. The engine system of claim 8, wherein the control valve is a vacuum actuated control valve.

10. The engine system of claim 9, wherein the vacuum actuated control valve includes a control chamber in fluid communication with one or both of the ejector and the aspirator or with the device requiring a vacuum.

11. The engine system of claim 8, wherein the control valve is an electromagnetically actuated control valve.

12. The engine system of claim 8, wherein the control valve is a vacuum actuated control valve or an electromagnetically actuated control valve.

13. The engine system of claim 9, wherein the control valve is a vacuum actuated control valve that includes a control chamber in fluid communication with one or both of the ejector and the aspirator or with the device requiring a vacuum.

14. An engine system comprising:
a flowpath between a junction upstream of a turbocharger and an intake manifold of an engine intake system;
an ejector and an aspirator connected in parallel relative to one another and forming a portion of the flowpath; and
a control valve in fluid communication within the flowpath upstream of the ejector and the aspirator and simultaneously controlling the flow into the aspirator and out of the ejector, or downstream of the ejector and the aspirator and simultaneously controlling the flow out of the aspirator and into the ejector;
wherein a first motive flow through the ejector is in an opposite direction relative to a direction of a second motive flow through the aspirator, the second motive flow being in a direction from an air induction conduit toward the intake manifold; and
wherein both the ejector and the aspirator have a suction port fluidly coupled to a device requiring vacuum.

15. The engine system of claim 14, wherein the control valve is a vacuum actuated control valve.

16. The engine system of claim 15, wherein the vacuum actuated control valve includes a control chamber in fluid communication with one or both of the ejector and the aspirator or with the device requiring a vacuum.

17. The engine system of claim 14, wherein the control valve is an electromagnetically actuated control valve.

18. The engine system of claim 14, further comprising a first check valve disposed in control of the motive flow through the ejector and a second check valve disposed in control of the motive flow through the aspirator.

19. The engine system of claim 18, further comprising a third check valve disposed in control of the flow through the suction port of the ejector and a fourth check valve disposed in control of the flow through the suction port of the aspirator.

20. The engine system of claim 18, wherein both the first and second check valves are positioned upstream of the ejector and aspirator when the control valve is downstream of the aspirator and ejector, or downstream of the ejector and aspirator when the control valve is upstream of the aspirator and ejector.

* * * * *